(12) United States Patent
Duenkelmann

(10) Patent No.: US 11,014,278 B2
(45) Date of Patent: May 25, 2021

(54) INJECTION-MOLDING DEVICE FOR PRODUCING MULTI COMPONENT MOLDINGS AND METHOD FOR PRODUCING MULTI-COMPONENT MOLDINGS

(71) Applicant: KAUTEX TEXTRON GMBH & CO. KG, Bonn (DE)

(72) Inventor: Oliver Duenkelmann, Rommerskirchen (DE)

(73) Assignee: KAUTEN TEXTRON GMBH & CO. KG, Bonn (DE)

( * ) Notice: Subject to any disclaimer, the term of this patent is extended or adjusted under 35 U.S.C. 154(b) by 443 days.

(21) Appl. No.: 16/062,965

(22) PCT Filed: Dec. 14, 2016

(86) PCT No.: PCT/EP2016/081001
§ 371 (c)(1),
(2) Date: Nov. 20, 2018

(87) PCT Pub. No.: WO2017/102843
PCT Pub. Date: Jun. 22, 2017

(65) Prior Publication Data
US 2019/0070761 A1    Mar. 7, 2019

(30) Foreign Application Priority Data

Dec. 18, 2015 (DE) .................. 10 2015 225 937.4

(51) Int. Cl.
*B29C 45/16* (2006.01)
*B29C 45/17* (2006.01)
(Continued)

(52) U.S. Cl.
CPC ...... *B29C 45/1639* (2013.01); *B29C 45/1704* (2013.01); *B29C 2045/0087* (2013.01);
(Continued)

(58) Field of Classification Search
CPC .................................................. B29C 45/1639
See application file for complete search history.

(56) References Cited

U.S. PATENT DOCUMENTS 8,827,690 B2   9/2014  Sakamoto et al.
2011/0180973 A1   7/2011  Mao
(Continued)

FOREIGN PATENT DOCUMENTS

CN     103269842    8/2013
DE     102005033172   1/2007
(Continued)

OTHER PUBLICATIONS

English translation of International Preliminary Report on Patentability dated Apr. 3, 2018, received in corresponding PCT Application No. PCT/EP2016/081001.
(Continued)

*Primary Examiner* — Matthew J Daniels
*Assistant Examiner* — Paul Spiel
(74) *Attorney, Agent, or Firm* — Grossman, Tucker, Perreault & Pfleger, PLLC

(57) ABSTRACT

The invention relates to an injection-molding device for producing multi-component moldings from a thermoplastic molding compound, comprising a mold, forming a first article cavity, comprising means for filling the first article cavity with the thermoplastic molding compound, comprising an injection device for injecting a fluid against a projectile to be driven, wherein the injection device comprises a projectile carrier with at least one injection nozzle and with
(Continued)

at least one projectile receptacle for a projectile as a displacer for the molding compound. The injection-molding device also comprises a mold insert, which forms a continuation of the first article cavity and encloses the projectile carrier, wherein the projectile carrier forms with the mold insert a second article cavity that can be filled with the molding compound, wherein the mold insert has a separate sprue and wherein the second article cavity of the mold insert can be sealed off for a time with respect to the first article cavity by means of movable mold parts. The invention also relates to a method for producing multi-component moldings by using the injection-molding device.

17 Claims, 3 Drawing Sheets

(51) Int. Cl.
    *B29C 45/00* (2006.01)
    *B29L 31/30* (2006.01)
    *B29L 31/00* (2006.01)
(52) U.S. Cl.
    CPC ... *B29C 2045/1719* (2013.01); *B29L 2031/30* (2013.01); *B29L 2031/7172* (2013.01)

(56) References Cited

U.S. PATENT DOCUMENTS

| | | | |
|---|---|---|---|
| 2012/0068388 A1 | 3/2012 | Sakamoto et al. | |
| 2015/0313631 A1* | 11/2015 | Fischvogt | ............... B29C 45/26 264/255 |

FOREIGN PATENT DOCUMENTS

| | | |
|---|---|---|
| DE | 102007015216 | 10/2008 |
| DE | 102010034919 | 7/2011 |
| DE | 102012011173 | 12/2013 |
| EP | 1116567 | 7/2001 |
| EP | 1484154 | 12/2004 |
| JP | 6-155509 | 6/1994 |

OTHER PUBLICATIONS

English translation of International Search Report dated Feb. 24, 2018, received in corresponding PCT Application No. PCT/EP2016/081001.

"2K-PIT-Verfahren Verfahren, Träger and Hohldichtung in einem gefertigt", Kunststoffe, Carl Hanser Publishing Company, Jul. 18, 2011, Germany.

* cited by examiner

INJECTION-MOLDING DEVICE FOR PRODUCING MULTI COMPONENT MOLDINGS AND METHOD FOR PRODUCING MULTI-COMPONENT MOLDINGS

FIELD

The invention relates to an injection-molding device for producing multi-component moldings from a thermoplastic molding compound, having a mold forming a first article cavity, having means for filling the first article cavity with the thermoplastic molding compound, having an injection device for injecting a fluid into the article cavity.

The invention furthermore relates to a method for producing multi-component moldings from a thermoplastic molding compound while using an injection-molding device of the afore-described type.

BACKGROUND

A method for injection molding multi-component compact moldings and multi-component hollow bodies from polymer molding compounds, in which displacement members in the form of projectiles are first placed into the opened cavity onto the sprues of the core component, and the main component is injected after the mold has been closed, is known from DE 10 2012 011 173 A1. The projectiles, conjointly with the respective core components, are subsequently driven sequentially through the mold cavity.

For example, tubes having a bi-component layered construction can be produced by way of said projectile injection technology described in DE 10 2012 011 173 A1. In the method, a displacement member of one polymer material component is driven through another polymer material component.

The tubes produced by the method according to DE 10 2012 011 173 A1 are configured in multiple layers across the entire length of said tubes, wherein the method is an interpretation of sandwich injection-molding.

Fundamentally, there is the requirement for providing tubular hollow bodies as multi-component moldings which in the direction of the longitudinal extent thereof are assembled from various components. In the case of a filler pipe for a fuel container there is, for example, the requirement for the latter in portions to be configured from various thermoplastic plastics materials.

Such structures are not able to be produced by the method known from DE 10 2012 011 173 A1.

Tubes which are assembled in portions from a plurality of components, or from various plastics materials of dissimilar properties, respectively, are in most instances blow molded or extruded and are then completed using further assembly and welding components.

An injection-molding device according to the preamble of claim 1 is known, for example, from EP 1 116 567 A2. Further prior art is known from documents DE 10 2012 011173 A1, JP H 06 155509 A, and DE 10 2007 015 216 A1.

SUMMARY

The invention is therefore based on the object of providing an injection-molding device for producing multi-component moldings from a thermoplastic molding compound, by way of which multi-component moldings in the form of hollow bodies which in portions are configured from a plurality of components are producible.

The invention is furthermore based on the object of providing a method for producing such multi-component moldings from a thermoplastic molding compound.

According to one aspect of the invention, an injection-molding device for producing multi-component moldings from a thermoplastic molding compound having a first mold forming a first article cavity is provided, having means for filling the first article cavity with the thermoplastic molding compound, having at least one first sprue for the first article cavity, having an injection device for injecting a fluid into the article cavity, having a mold core, and having a mold insert which forms an appendage of the first article cavity and which encloses the mold core, wherein the mold core conjointly with the mold insert forms a second article cavity that is capable of being filled with a molding compound, wherein the second article cavity of the mold insert has a second sprue, and wherein the second article cavity of the mold insert can be temporarily sealed in relation to the first article cavity by means of movable mold parts.

According to the invention, a second article cavity which adjoins the first article cavity in a coaxial and aligned manner is formed in this way by means of the mold insert and of the mold core that is disposed in the latter, wherein the second article cavity can be temporarily sealed in relation to the first article cavity, and the mold core in the second article cavity forms a caliber for the hollow body to be molded in such a manner that the hollow body in this region has a defined internal diameter.

The hollow body can be, but does not necessarily have to be, configured so as to be tubular. A person skilled in the art will observe that the hollow body to be molded as the article can also have arbitrary polygonal cross sections.

In the case of one variant of the injection-molding device according to the invention it is provided that the injection device comprises a projectile carrier having at least one injection nozzle and at least one projectile receptacle for a projectile as the displacement member for the molding compound, and that the projectile carrier is configured as the mold core of the mold insert.

The projectile is placed onto the projectile carrier preferably in the case of an opened mold. The projectile carrier can be configured as a type of mandrel or caliber which conjointly with the mold insert forms the second article cavity that is capable of being filled with the molding compound, wherein the projectile carrier forms the mold core of the mold insert that is enclosed by the mold insert. The second article cavity that thus is capable of being filled with the molding compound directly adjoins the article cavity.

The second article cavity can be filled with a molding compound by way of the second sprue of the mold insert, said molding compound potentially being different from the molding compound with which the first article cavity is completely or partially filled.

The injection-molding device according to the invention expediently comprises a secondary cavity which receives the displaced molding compound.

Alternatively, the injection-molding device according to the invention can be configured such that the displaced molding compound is conveyed back into the device for extruding, for example into the extruder. This can be established, for example, in that the sprue is disposed on an end of the article cavity, and the molding compound in this instance is conveyed back into the extruder in the case of a reverse rotation of the worm of the extruder.

The mold insert can be configured, for example, as a mold insert in multiple parts.

A mold in the context of the present patent application refers to those parts of the injection-molding device which form the first article cavity. The mold in the context of the invention can have further movable mold parts such as slides, movable mold cores, and the like. The first article cavity of the mold is connected to a secondary cavity which receives the displaced molding compound.

The injection device according to the invention is configured for injecting a pressurized fluid, for example for injecting water, into the first article cavity. The fluid, for example water, that is injected into the article cavity can directly, that is to say without the use of a projectile, displace a molten core of the molding compound that is received by the first article cavity into a secondary cavity.

When the injection device according to the invention is configured as an injection device having a projectile carrier, the projectile carrier of the injection device can be penetrated by one or a plurality of fluid ducts, and at the end of said projectile carrier that is configured for receiving the projectile can have an injection nozzle. In this way, the projectile can be driven through the first article cavity by means of the fluid. The molten core of the molding compound that is received by the first article cavity is here in displaced into the secondary cavity mentioned above.

The secondary cavity, or another volume into which the molding compound is displaced, can initially be separated from the first article cavity by means of hydraulically activatable slides. The volume or the secondary cavity can be released by means of the mentioned slides after a partial or complete filling of the first article cavity with the molding compound, such that the displaced molding compound can enter the secondary cavity.

The injection-molding device according to the invention preferably comprises at least two sprues, wherein the first sprue opens into the first article cavity, and the second sprue opens into the second article cavity between the mold core and the mold insert.

In the case of one expedient variant of the injection-molding device according to the invention it is provided that the mold insert is readjustable relative to the mold, that the mold insert in a first position is sealed in relation to the movable mold parts, and that the mold insert in a second advanced position seals the first article cavity of the mold.

The movable mold parts can be configured as slides which are known per se and which in the first position close the second article cavity that is formed between the mold core and the mold insert such that the second article cavity can be filled with a thermoplastic molding compound. In the meantime, the second article cavity by way of the movable mold parts is sealed such that said molding compound cannot invade the first article cavity. The second article cavity in the second position of the movable mold parts is preferably opened in relation to the first article cavity such that a molding compound that has been filled by way of the first sprue into the first article cavity can connect to the molding compound within the second article cavity.

The mold insert and the mold core expediently form a re-adjustable functional unit which, for example, as an entity can be configured so as to be capable of being advanced in the direction of the first article cavity and being retracted therefrom.

In the case of one particularly preferred variant of the injectioning device according to the invention it is provided that the mold insert has a mold cavity, the internal diameter of the latter corresponding to the internal diameter of the first article cavity, and that the mold cavity is disposed so as to be coaxial with the first article cavity. The mold cavity and the mold core form the second article cavity.

In this way, a hollow body having in portions different components of a molding compound, or from different molding compounds, respectively, can be produced, said hollow body having a continuous consistent and uniform external diameter.

The term component in the context of the invention relates to a thermoplastic molding compound, or a thermoplastic plastics material, respectively, having a specific composition. The term component in the context of the invention is not at all to be understood as that said component refers to a component part of a mixture.

When the injection device comprises a projectile carrier the external diameter of the projectile carrier at least across a partial length can correspond to the external diameter of the projectile to be received by the projectile carrier, such that the internal diameter of the article to be configured as the hollow body that is imparted by the projectile carrier in this region corresponds approximately to the internal diameter of the article in that region that has been molded by means of the projectile.

In the case of one advantageous variant of the injection-molding device according to the invention the movable mold parts have toroidal sealing faces which in a first closed position bear on a correspondingly configured sealing face of the mold core, and which in a second opened position form an advancement path for the mold insert and the mold core.

The first position of the mold insert is preferably a retracted position of the mold insert, and the second position is preferably an advanced position of the mold insert through the advancement path.

In the case of a further advantageous variant of the injection-molding device according to the invention the movable mold parts have end faces having a step-shaped profile. Alternatively, the end faces can have a profile which forms an undercut.

By way of a step-shaped or echelon-shaped, respectively, configuration of the end faces a corresponding geometry of the components of the hollow body that are joined to one another in an abutting manner can be achieved.

The projectile carrier is expediently configured as a mandrel which has an end that is configured for receiving the projectile and forms at least one injection nozzle.

The end configured for receiving the projectile preferably has an external diameter that is smaller than a shank of the mandrel which substantially performs the function of the mold core of the mold insert.

A further aspect of the invention relates to a method for producing multi-component moldings from a thermoplastic molding compound while using an injection-molding device for the fluid injection technology or the projectile injection technology.

The invention in particular also relates to a method for producing multi-component moldings from a thermoplastic molding compound while using an injection-molding device having one or a plurality of the afore-explained features.

Even when mention is made in the present application of "a" thermoplastic molding compound, this is understood to mean that this includes the use of different thermoplastic molding compounds, or the use of molding compounds from different components of a thermoplastic plastics materials, respectively. The term component in the context of the present invention is expressly not to be understood in the context of a component part of the mixture. A component in the context of the invention is understood to be a thermoplastic molding compound of a type which can be composed of a single thermoplastic plastics material, or from a blend of different thermoplastic plastics materials.

The method can comprise the following method steps:

a) providing an injection-molding device comprising a mold having a first article cavity, having an injection device, having a mold core, and having a mold insert which forms an appendage of the first article cavity and which encloses the mold core, wherein the mold core conjointly with the mold insert forms a second article cavity that is capable of being filled with a molding compound;

b) sealing the second article cavity of the mold insert by means of movable mold parts;

c) at least partially filling the second article cavity with a plasticized molding compound from a first component of a thermoplastic plastics material, d) opening the mold parts, preferably after the molding compound that has been filled in step c) has at least partially solidified to a hollow body, preferably to a tubular preform;

e) readjusting the mold insert conjointly with the mold core into an advancement path that is formed by the mold parts;

f) at least partially filling the first article cavity with a molding compound from a second component of a thermoplastic plastics material, wherein the second component is different from the first component, and the first component and the second component in molecular terms are compatible, and wherein the second component connects to the preform;

g) introducing a pressurized fluid into the first article cavity by means of the injection device such that the fluid displaces part of the molding compound from the first article cavity such that a hollow body, preferably a tubular article, is configured; and i) demolding the article which is configured as a multi-component molding.

The aforementioned method steps are preferably carried out in the sequence of the enumeration thereof.

The method can be carried out, for example, while using the known water injection technology.

According to one variant of the method, the use of an injection-molding device in which the injection device comprises a projectile carrier as the mold core of the mold insert may be provided, wherein the method can comprise the following further method steps:

j) providing a projectile; and k) equipping the projectile carrier with the projectile, wherein the readjustment of the mold insert into the advancement path that is formed by the mold parts is performed conjointly with the projectile carrier, and the fluid drives the projectile through the first article cavity while displacing part of the molding compound in such a manner that the projectile configures the hollow body.

Providing the projectile according to method step j) and equipping the projectile carrier according to method step k) is preferably performed prior to method step b).

The method according to the invention can be provided as a multi-component injection-molding method by way of projectile injection technology, wherein the method combines the project injection technology with a bi-component injection-molding method in which different thermoplastic molding compounds are interconnected by way of separate sprues.

The method preferably provides initially for the mold that defines the first article cavity to be opened and for the projectile carrier to be equipped with the projectile. The mold thereafter is closed. The mold insert herein can be located in a retracted position. In this position of the mold insert, the second article cavity of the mold insert, the latter being formed conjointly with the projectile carrier, or as the mold core, respectively, is sealed by means of movable mold parts. Partial or complete filling of the second article cavity with a plasticized molding compound from a first component of a thermoplastic plastics material can subsequently be performed. The second article cavity can be configured as an annular space, for example.

Once the molding compound that has been filled as per method step c) has, for example, solidified to a tubular preform or injection-molded part, respectively, the mold insert conjointly with the mold core, the latter being potentially configured as the projectile carrier, for example, can be advanced into an advancement path that is formed by the mold parts such that the projectile carrier having a projectile placed thereon, said projectile being configured as plastics material projectile, for example, is advanced into the first article cavity. The injection-molded part, or preform, respectively, which preferably forms an end of the hollow body to be fabricated, or of the tube to be fabricated, respectively, herein can likewise at least partially project into the first article cavity. The preform, or injection-molded part, respectively, can in any case seal the first article cavity at the end such that the first article cavity subsequently can at least partially filled with a molding compound from a second component of a thermoplastic plastics material.

A thermoplastic elastomer, for example, can be provided as the first component of a thermoplastic plastics material; substantially impact-resistant polyolefin which in molecular terms is compatible at least with the thermoplastic plastics material of the thermoplastic elastomer can be provided as the second component, for example.

The second component can connect in a materially integral manner to the preform, or to the injection-molded part, respectively, during method step g).

It can be provided thereafter that a secondary cavity of the mold is opened.

A pressurized fluid can subsequently be introduced into the first article cavity by means of the injection device such that the fluid, while displacing part of the molding compound through the first article cavity into the secondary cavity, drives the projectile in such a manner that the projectile configures a tubular article having a calibrated internal diameter.

The demolding of the finished article can then finally be performed.

The invention preferably relates to a method for producing a multi-component filler pipe for a fluid container of a motor vehicle as the multi-component molding. The filler pipe at the end side can be configured so as to have, for example, an integrally molded TPE (thermoplastic elastomer) attachment or appendage, respectively, and be composed substantially of polyamide, HDPE (high-density polyethylene), or of a similar polyolefin.

The method enables such multi-component tubes to be readily produced in an integral manner by injection-molding in one operational step.

In the case of one expedient design embodiment of the method according to the invention it is provided that the projectile carrier is used as the mold core within the mold insert. The mold core, for example as the projectile carrier, can be re-adjustable relative to the mold insert.

In the context of the invention it is advantageous for the mold core to be readjusted conjointly with the mold insert.

In the case of one expedient variant of the method according to the invention it is provided that the first component and the second component comprise one or a plurality of thermoplastic plastics materials which are selected from a group comprising high-density polyethylene, polyamide, polyamide 6, polyamide 12, polyurethane, polycarbonate, acrylonitrile-butadiene-styrene copolymer, polyketone, polystyrene, thermoplastic olefin-based elastomers, cross-linked thermoplastic olefin-based elastomers, thermoplastic urethane-based elastomers, thermoplastic polyester elastomers, and thermoplastic copolymers.

The article according to the invention is preferably produced so as to have a portion from a non-elastomer material and an end portion from an at least partially elastomer material.

BRIEF DESCRIPTION OF THE DRAWINGS

The invention will be explained hereunder by means of an exemplary embodiment illustrated in the drawings in which.

DETAILED DESCRIPTION

Figure 1:
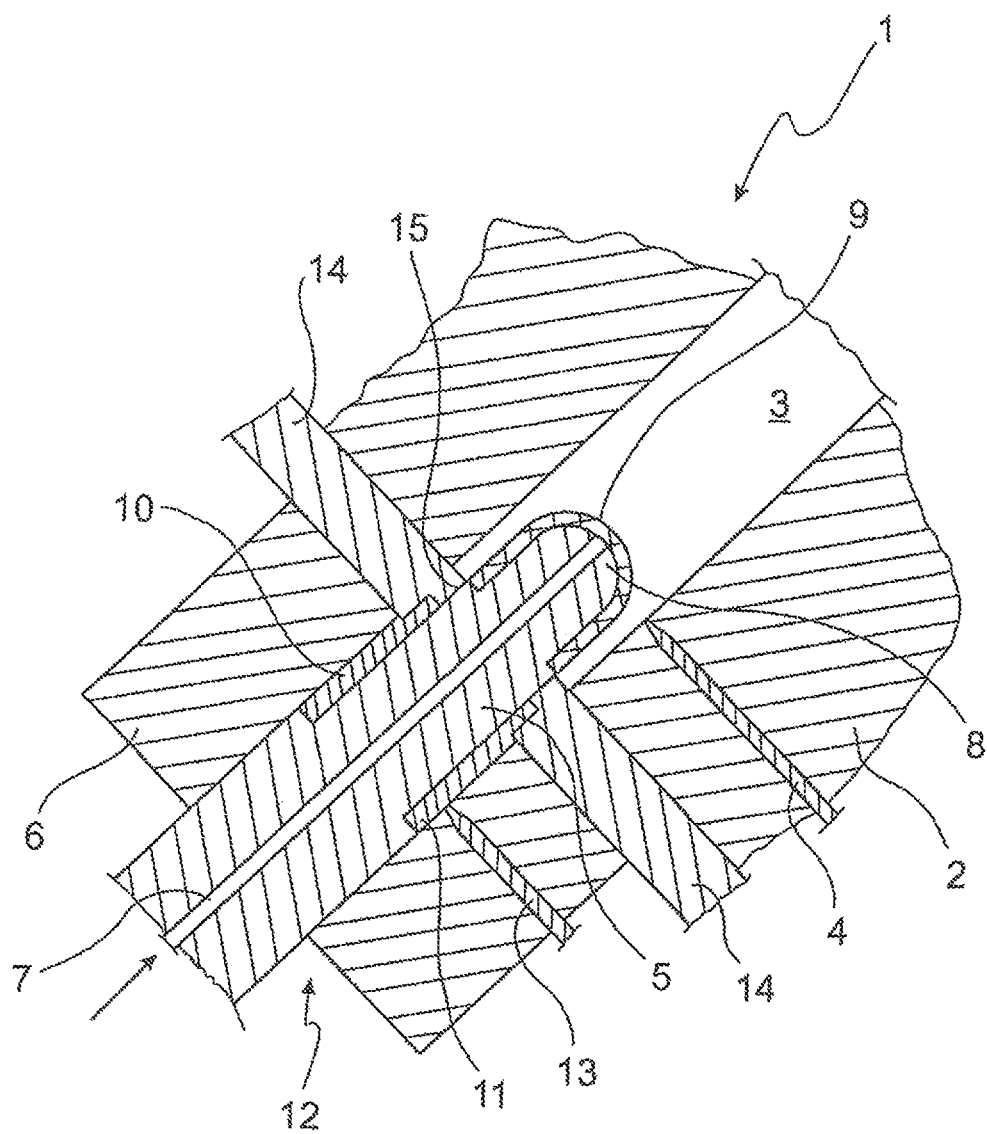
FIG. 1 shows a schematic partial sectional view of an injection-molding mold according to a first exemplary embodiment of the invention, in a first position of the mold insert.

The figures in a simplified manner show parts of an injection-molding device 1 according to the invention. Devices for extruding the thermoplastic molding compound are not illustrated for reasons of simplification. The injection-molding device 1 comprises a mold 2 which is composed, for example, of two mold halves which define a first article cavity 3. The first article cavity 3 can be configured, for example, in the form of a tube (3D tube) that is curved multiple times in space. The mold 2 comprises a plurality of movable components in the form of slides and the like, and at least one secondary cavity. The secondary cavity is capable of being blocked in relation to the first article cavity 3 by means of slides. These details are likewise not illustrated in the drawings for reasons of simplification.

Figure 2:
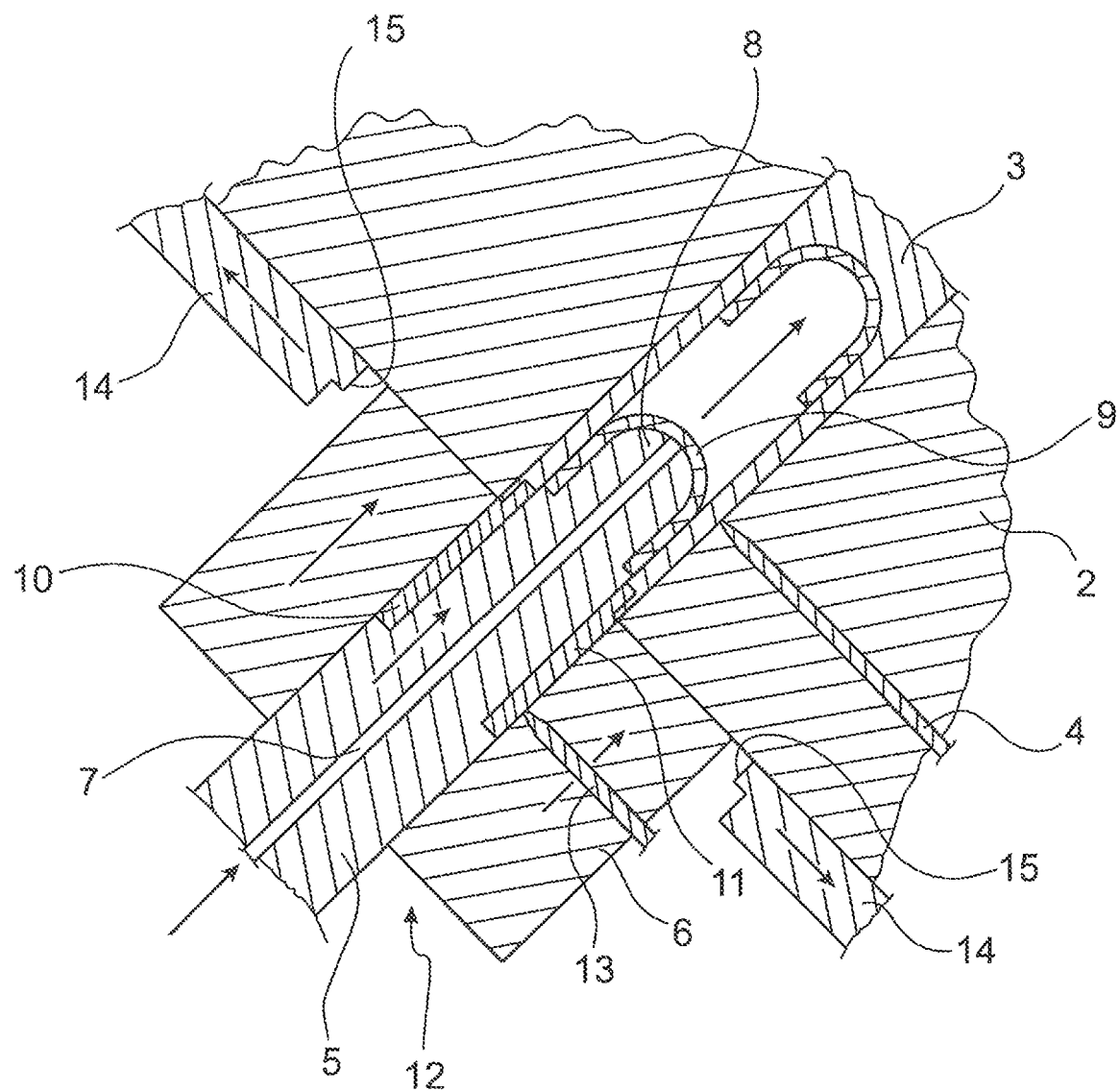
FIG. 2 shows a view corresponding to that of FIG. 1, in which the mold insert is located in a second position.

FIGS. 1 and 2 show an end of the first article cavity 3 in the region of an end of the tube to be molded as the article, for example. The mold 2 comprises a first sprue 4 which opens into the first article cavity. Furthermore, an injection device 12 having a projectile carrier 5 is disposed so as to be adjacent to the mold 2. The projectile carrier 5 penetrates a movable mold insert 6 which is configured in one or multiple parts and which is part of the injection-molding device.

The mold insert 6 forms an appendage of the first article cavity 3. The internal diameter of the mold insert 6 corresponds to the internal diameter of the first article cavity 3. The appendage thus formed is disposed so as to be aligned with and coaxial with the first article cavity 3.

As has already been mentioned above, the mold insert 6 conjointly with the projectile carrier 5 is re-adjustable in the direction of the arrow indicated in FIG. 1, that is to say in the direction of the longitudinal axis of the first article cavity 3. The projectile carrier 5 is penetrated by a fluid duct 7 which on the free end of the projectile carrier 5 configures an injection nozzle 8.

The projectile carrier 5 which is configured as a mandrel, on the free end of said projectile carrier 5 receives a projectile 9 which is configured as a plastics material cap.

The projectile carrier 5 comprises a shank portion 10, the diameter being smaller than the internal diameter of the mold insert 6 by the dimension of the wall thickness of the article to be fabricated. The projectile carrier 5 conjointly with the mold insert 6 forms a second article cavity 11 in the shank portion 10, said article cavity 11 being capable of being filled with a thermoplastic molding compound by way of a second sprue 13.

The second article cavity 11 that is formed between the projectile carrier 5 and the mold insert 6 by way of two movable mold parts in the form of separation slides 14 is capable of being blocked in relation to the first article cavity 3.

FIG. 1 shows the mold insert 6 in a first retracted position in which the separation slides 14 in each case by way of a sealing face 15 bear on the shank portion 10 of the profile carrier 5. The projectile carrier, the first article cavity 3, and the second article cavity 11 have in each case a toroidal cross-section. The sealing faces 15 of the separation slides 14 are configured in the shape of a circular segment and encompass the shank portion 10 of the projectile carrier 5 such that the second article cavity 11 is completely sealed by way of the separation slides 14.

FIG. 1 shows the second article cavity 11 in a state in which the latter is filled with a thermoplastic molding compound. FIG. 2 shows the assembly drawn in FIG. 1, wherein the separation slides 14 therein are open such that the sealing faces 15 no longer bear on the shank portion 10 of the profile carrier 5. Moreover, the mold insert 6 is shown in a position advanced in the direction toward the first article cavity 3, in which position the second article cavity 11 communicates with the first article cavity 3, and the first article cavity 3 is sealed by way of the mold insert 6. When the separation slides 14 are repositioned to the opened position illustrated in FIG. 2, said separation slides 14 release an advancement path for the mold insert 6.

The state of the injection-molding device 1 in which the first article cavity 3 is also filled with a thermoplastic molding compound is illustrated in FIG. 2.

The method according to the invention will now be explained hereunder with reference to FIGS. 1 and 2.

The method initially provides that the mold 2 which, for example, is composed of two mold halves is open. In this method step, the mold insert 6 is disposed relative to the mold halves in the position illustrated in FIG. 1. The projectile carrier 5 thereafter, at the leading end thereof, is equipped with a projectile 9. The mold halves of the mold 2 are closed and kept shut.

In a next method step, a first thermoplastic molding compound having a first thermoplastic component is filled into the second article cavity 11 that is formed between the projectile carrier 5 and the mold insert 6. The second article cavity 11 is sealed by way of the separation slides 14. The separation slides 14 have in each case end faces having a step-shaped profile such that an end face of the preform molded in the second article cavity 11 has a corresponding staged contour in a step-shaped manner.

Once the preform/injection-molded part thus produced has at least partially solidified, the separation slides 14 are opened, that is to say repositioned to the position illustrated in FIG. 2 in which said separation slides 14 form an advancement path for the mold insert 6. The mold insert 6 thereafter is advanced in the direction toward the first article cavity 3 such that the now exposed end side of the preform partially protrudes into the first article cavity 3. The mold insert 6 in this position assumes sealing of the first article cavity 3.

In a next method step, a second thermoplastic molding compound having a second thermoplastic component is filled into the first article cavity 3 by way of the first sprue 4. As is commonplace in injection-molding, filling can be performed completely or partially.

Slides which connect the secondary cavity to the first article cavity 3 (not illustrated) are opened in a further method step. The fluid duct 7 thereafter is impinged with a pressurized fluid, for example with water. Pressurized fluid exits the injection nozzle 8 and drives the projectile 9 through the first article cavity 3, and herein displaces a liquid core of the thermoplastic molding compound that has been injected into the first article cavity 3 into the secondary cavity, on account of which a tubular article from a thermoplastic plastics material having a defined residual wall thickness and a comparatively defined internal diameter is created.

A thermoplastic elastomer is preferably injected by way of the second sprue 13 of the mold insert as the first thermoplastic molding compound; a non-thermoplastic component which is compatible with the thermoplastic elastomer can be provided as the second thermoplastic molding compound which can be injected into the first article cavity 3 by way of the first sprue 4.

After the mold 2 has been opened, the multi-component molding in the form of an integral tube thus produced from thermoplastic plastics material can be retrieved.

Figure 3:
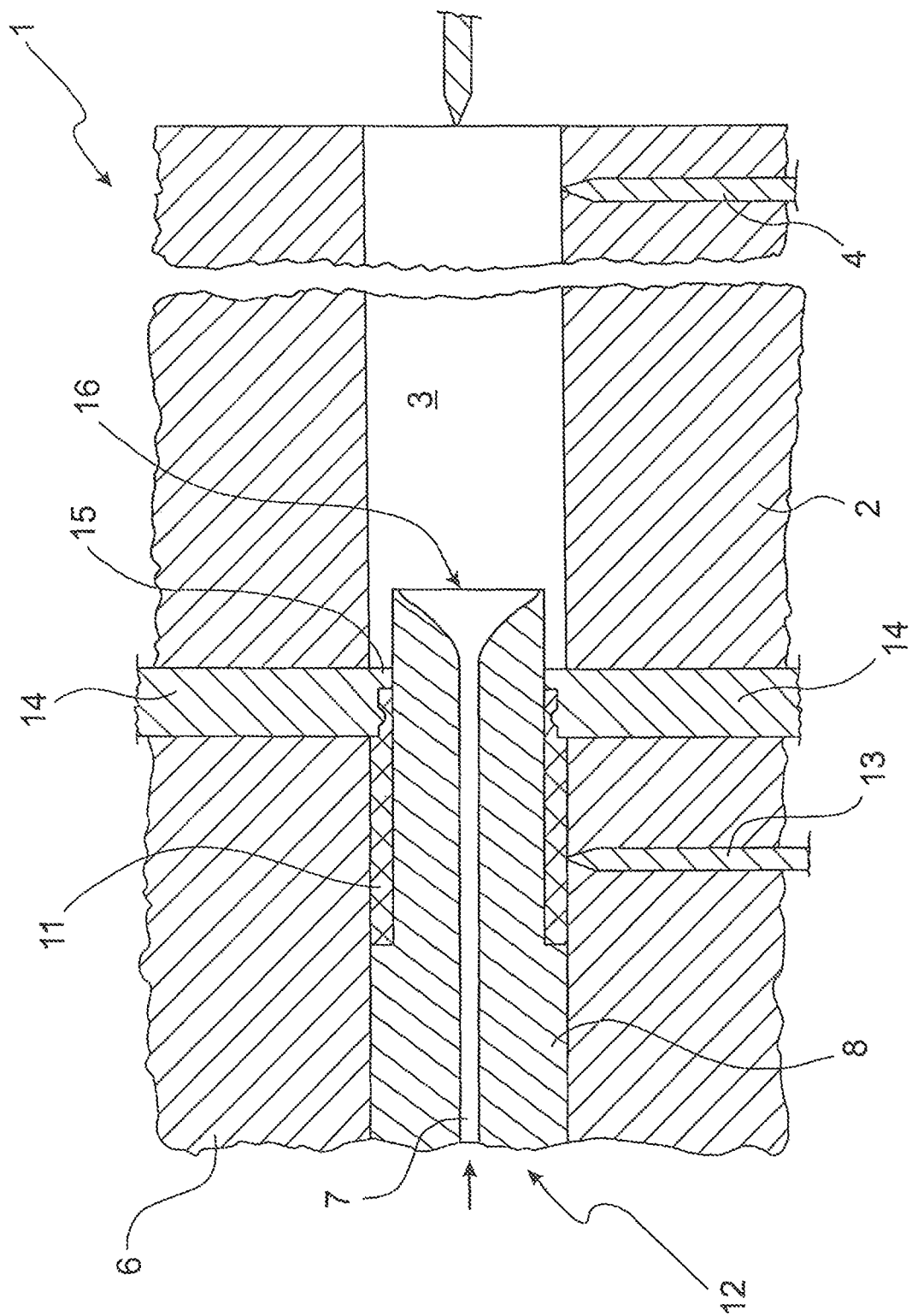
FIG. 3 shows a schematic partial sectional view of an injection-molding mold according to a second exemplary embodiment of the invention.

FIG. 3 shows a second exemplary embodiment of an injection-molding device 1 according to the invention. In the case of the exemplary embodiment illustrated in FIG. 3, components which correspond to those of the first exemplary embodiment are provided with the same reference signs.

The injection-molding device 1 according to FIG. 3 is configured for carrying out the method according to the invention in which a pressurized fluid is introduced directly into the article cavity 3 (water injection technology/WIT). Accordingly, the injection-molding device 1 according to FIG. 3 differs from that according to FIGS. 1 and 2 in that the mold insert 6 comprises an injection nozzle 8 which is configured as a simple mold core and which does not receive any projectile.

The mold insert 6 otherwise corresponds to that according to FIGS. 1 and 2. The method carried out by the injection-molding device 1 according to FIG. 3 differs from the method that is carried out by the injection-molding device according to FIGS. 1 and 2 in that no projectile is provided which while displacing part of the molding compound is driven through the first article cavity 3.

FIG. 3 shows the mold insert 6 in a position in which the latter forms a second article cavity 11 which is capable of being filled with the molding compound, wherein the second article cavity 11 is sealed in relation to the first article cavity 3 by means of the separation slides 14. The filling of the second article cavity 11 with the plasticized molding compound is subsequently performed by way of the second sprue 13.

When the molding compound has at least partially solidified, the separation slides 14 are opened and the mold insert 6 in a manner corresponding to the assembly in FIG. 2, is advanced in the direction toward the first article cavity 3 such that the now exposed end side of the preform/injection-molded part thus produced protrudes into the first article cavity. The mold insert 6 in this position assumes the sealing of the first article cavity 3.

In a next method step, a second thermoplastic molding compound, or a second thermoplastic component, respectively, is filled into the first article cavity 3 by way of the first sprue 4. Also in the case of the exemplary embodiment according to FIG. 3, filling can be performed completely or partially.

In a further method step, slides which connect the secondary cavity to the first article cavity 3 are opened (not illustrated). The fluid duct 7 is thereafter impinged with a pressurized fluid, for example with water. The pressurized fluid exits the injection nozzle 8 and herein displaces directly a liquid core of the thermoplastic molding compound that has been injected into the article cavity 3 into the secondary cavity. In order for a displacement of the as yet plastic molding compound to be caused across the largest area possible, the injection nozzle 8 is provided with a port 16 that is widened in the manner of a diffuser.

The separation slides 14 according to the exemplary embodiment illustrated in FIG. 3 differ from the separation slides 14 according to the exemplary embodiment illustrated in FIGS. 1 and 2 in that the end faces of said separation slides 14 have a profile which generates an undercut on the preform, into which undercut the second component of the thermoplastic plastics material that is injected into the second article cavity 3 can engage such that the portions of the article thus generated engage in one another in a materially integral as well as a form-fitting manner The multi-component molding produced by the method according to the invention can be configured, for example, as a filler pipe of a fluid container of a motor vehicle, said filler pipe potentially having a first portion from a thermoplastic polymer and a second portion from HDPE or, for example, a polyamide.

LIST OF REFERENCE SIGNS

1. Injection-molding device
2. Mold
3. First article cavity
4. First sprue
5. Projectile carrier
6. Mold insert
7. Fluid duct
8. Injection nozzle
9. Projectile
10. Shank portion of the projectile carrier
11. Second article cavity
12. Injection device
13. Second sprue
14. Separation slide
15. Sealing face
16. Port of the injection nozzle 8 (FIG. 3 only)

What is claimed is:
1. A method for producing a plastic article, comprising:
 a) providing an injection-molding device comprising
  a mold having a first article cavity,
  an injection device to inject fluid into the first article cavity,
  a mold core,
  a mold insert,
  wherein the mold insert forms an appendage of the first article cavity and which encloses the mold core,
  wherein at least the mold core and the mold insert form a second article cavity;

b) sealing the second article cavity by movable mold parts;
c) at least partially filling the second article cavity with a second article molding compound;
d) opening the mold parts after the second article molding compound has at least partially solidified;
e) moving the mold insert and the mold core along an advancement path that is formed by the opening of the mold parts;
f) at least partially filling the first article cavity with a first article molding compound, wherein the first article molding compound is different from the second article molding compound, and the first article molding compound and the second article molding compound are compatible in molecular terms, and wherein the first article molding compound connects to the second article molding compound;
g) introducing a fluid into the first article cavity with the injection device such that the fluid displaces a portion of the first article molding compound from the first article cavity to provide the plastic article having a hollow body; and
i) demolding the article.

2. The method as claimed in claim 1, wherein the injection device comprises a projectile carrier, which is provided as the mold core, and the method further comprises:
j) providing a projectile;
k) equipping the projectile carrier with the projectile, wherein moving the mold insert into the advancement path that is formed by the mold parts is performed conjointly with the projectile carrier, and wherein the fluid drives the projectile through at least a portion of the first article cavity while displacing a portion of the first article molding compound in such a manner that the projectile configures the hollow body.

3. The method as claimed in claim 1, wherein:
the first article molding compound and the second article molding component each comprise at least one thermoplastic material which is selected from a group comprising high-density polyethylene, polyamide, polyamide 6, polyamide 12, polyurethane, polycarbonate, acrylonitrile-butadiene-styrene copolymer, polyketone, polystyrene, olefin-based thermoplastic elastomers, cross-linked thermoplastic olefin-based elastomers, thermoplastic urethane-based elastomers, thermoplastic polyester elastomers, and thermoplastic copolymers.

4. The method as claimed in claim 1, wherein:
the second article molding compound is thermoplastic material which is a thermoplastic elastomer and the first article molding compound is a thermoplastic material which is not a thermoplastic elastomer.

5. The method as claimed in claim 1, wherein at least partially filling the second article cavity with a second article molding compound further comprises:
at least partially filling the second article cavity with a second article molding compound through a second article cavity sprue.

6. The method as claimed in claim 5, wherein:
the second article cavity sprue opens into the second article cavity.

7. The method as claimed in claim 5, wherein:
the second article cavity sprue is disposed in the mold insert.

8. The method as claimed in claim 1, wherein sealing the second article cavity by movable mold parts further comprises:
sealing the second article cavity by movable mold parts which bear against the mold core.

9. The method as claimed in claim 1, wherein:
the movable mold parts comprise at least one slide.

10. The method as claimed in claim 1, wherein:
the movable mold parts form a portion of the second article cavity with the mold core and the mold insert.

11. The method as claimed in claim 1, wherein:
the movable mold parts each have an end face having an undercut or step-shaped profile.

12. The method as claimed in claim 1, wherein at least partially filling the first article cavity with a first article molding compound further comprises:
at least partially filling the first article cavity with a first article molding compound through a first article cavity sprue.

13. The method as claimed in claim 12, wherein:
the first article cavity sprue opens into the first article cavity.

14. The method as claimed in claim 1, wherein:
the mold insert is movable relative to the mold, from a first position which is sealed in relation to the movable mold parts to a second position which seals the first article cavity of the mold.

15. The method as claimed in claim 1, wherein:
the second article cavity is configured as an annular space.

16. The method as claimed in claim 1, wherein:
the mold insert and the mold core are conjointly advanceable in a direction towards the first article cavity and conjointly retractable in a direction away from the first article cavity.

17. The method as claimed in claim 1, wherein moving the mold insert and the mold core along an advancement path that is formed by the opening of the mold parts further comprises:
moving the mold insert and the mold core along an advancement path that is formed by the opening of the mold parts such that the second article molding compound which at least partially fills the second article cavity enters a portion of the first article cavity.

* * * * *